(12) United States Patent
Kisterev et al.

(10) Patent No.: US 8,137,552 B2
(45) Date of Patent: Mar. 20, 2012

(54) DEVICE FOR TREATING AND PURIFYING A LIQUID PRODUCT

(75) Inventors: Valeriy Evgenyevich Kisterev, Moscow (RU); Pavel Dmitrievich Zherdev, Moscow Region (RU)

(73) Assignee: Obschestvo S. Ogranichennoi Otvestvennostiyu "Eurostandart", Moscow (RU)

( * ) Notice: Subject to any disclaimer, the term of this patent is extended or adjusted under 35 U.S.C. 154(b) by 187 days.

(21) Appl. No.: 12/447,707

(22) PCT Filed: Feb. 20, 2008

(86) PCT No.: PCT/RU2008/000092
§ 371 (c)(1),
(2), (4) Date: Apr. 29, 2009

(87) PCT Pub. No.: WO2008/111873
PCT Pub. Date: Sep. 18, 2008

(65) Prior Publication Data
US 2010/0051534 A1    Mar. 4, 2010

(30) Foreign Application Priority Data
Mar. 9, 2007  (RU) .............................. 2007108676

(51) Int. Cl.
*B01D 27/14* (2006.01)
*B01D 35/02* (2006.01)

(52) U.S. Cl. ........ 210/282; 210/290; 210/335; 210/432; 210/436; 210/449; 210/460; 210/469; 215/252

(58) Field of Classification Search ............ 210/266, 210/282, 335, 432, 436, 449, 454, 460, 463, 210/464, 469, 290; 215/252
See application file for complete search history.

(56) References Cited

U.S. PATENT DOCUMENTS

| | | | | | |
|---|---|---|---|---|---|
| 3,220,555 | A * | 11/1965 | Silha | ............... | 210/282 |
| 3,782,549 | A * | 1/1974 | Muller | ............ | 210/460 |
| 5,431,813 | A * | 7/1995 | Daniels | ........... | 210/282 |
| 5,680,945 | A * | 10/1997 | Sander et al. | ............ | 215/252 |
| 5,681,463 | A * | 10/1997 | Shimizu et al. | ............ | 210/266 |
| 5,727,705 | A * | 3/1998 | Kelly | ............ | 215/252 |
| 5,775,527 | A * | 7/1998 | Bosl et al. | ............ | 215/252 |
| 5,914,045 | A * | 6/1999 | Palmer et al. | ............ | 210/282 |
| 5,919,365 | A * | 7/1999 | Collette | ............ | 210/432 |
| 5,928,512 | A * | 7/1999 | Hatch et al. | ............ | 210/282 |
| 6,193,886 | B1 * | 2/2001 | Nohren, Jr. | ............ | 210/282 |
| 6,197,193 | B1 * | 3/2001 | Archer | ............ | 210/266 |
| 6,395,170 | B1 * | 5/2002 | Hughes et al. | ............ | 210/469 |
| 6,468,435 | B1 * | 10/2002 | Hughes et al. | ............ | 210/282 |
| 7,156,994 | B1 * | 1/2007 | Archer | ............ | 210/266 |
| 2002/0088745 | A1 * | 7/2002 | Barlow | ............ | 210/266 |

* cited by examiner

*Primary Examiner* — Christopher Upton
(74) *Attorney, Agent, or Firm* — Galgano & Associates, PLLC; Thomas M. Galgano; Jessica G. Bower

(57) ABSTRACT

The invention substantially relates to the distillery industry. Said invention makes it possible to increase the vodka purification efficiency by arranging a filter in the entire volume of a cartridge and by flowing a liquid product through the equal volume of filtering materials.

7 Claims, 2 Drawing Sheets

DEVICE FOR TREATING AND PURIFYING A LIQUID PRODUCT

Figure 1:
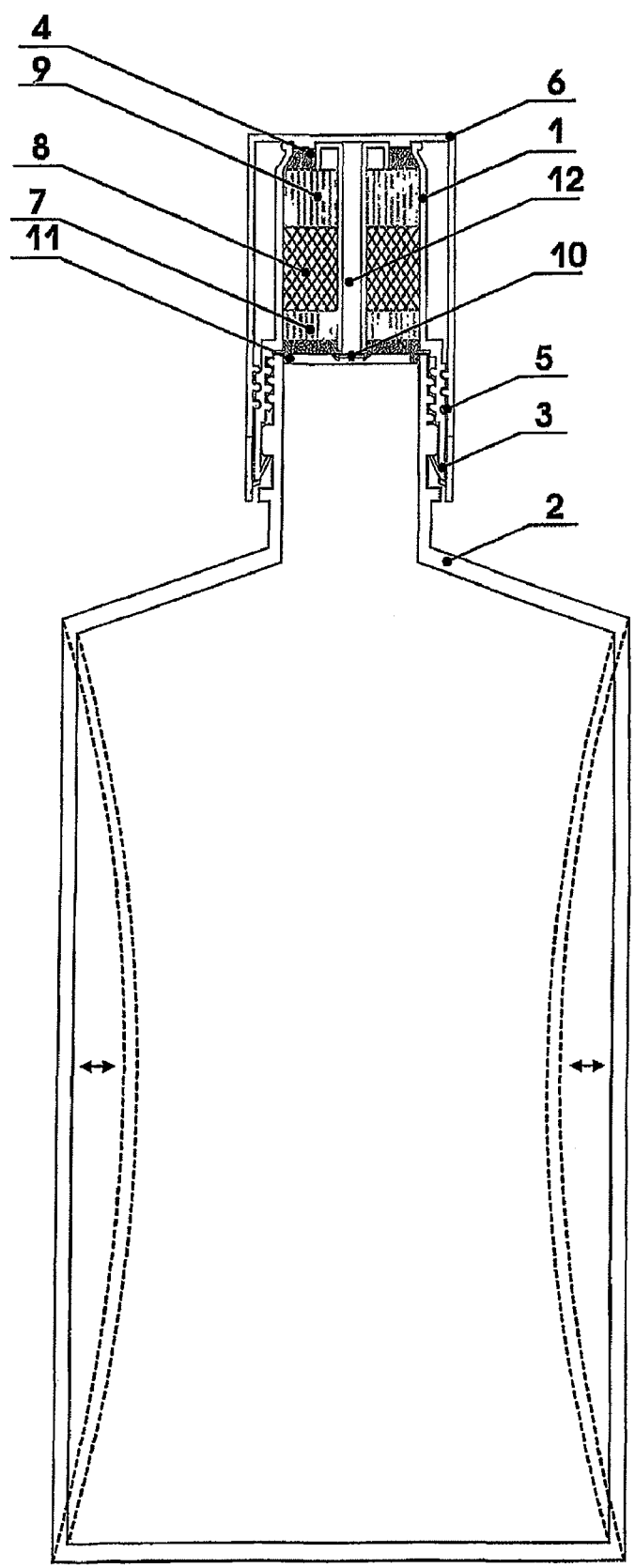
Figure 2:
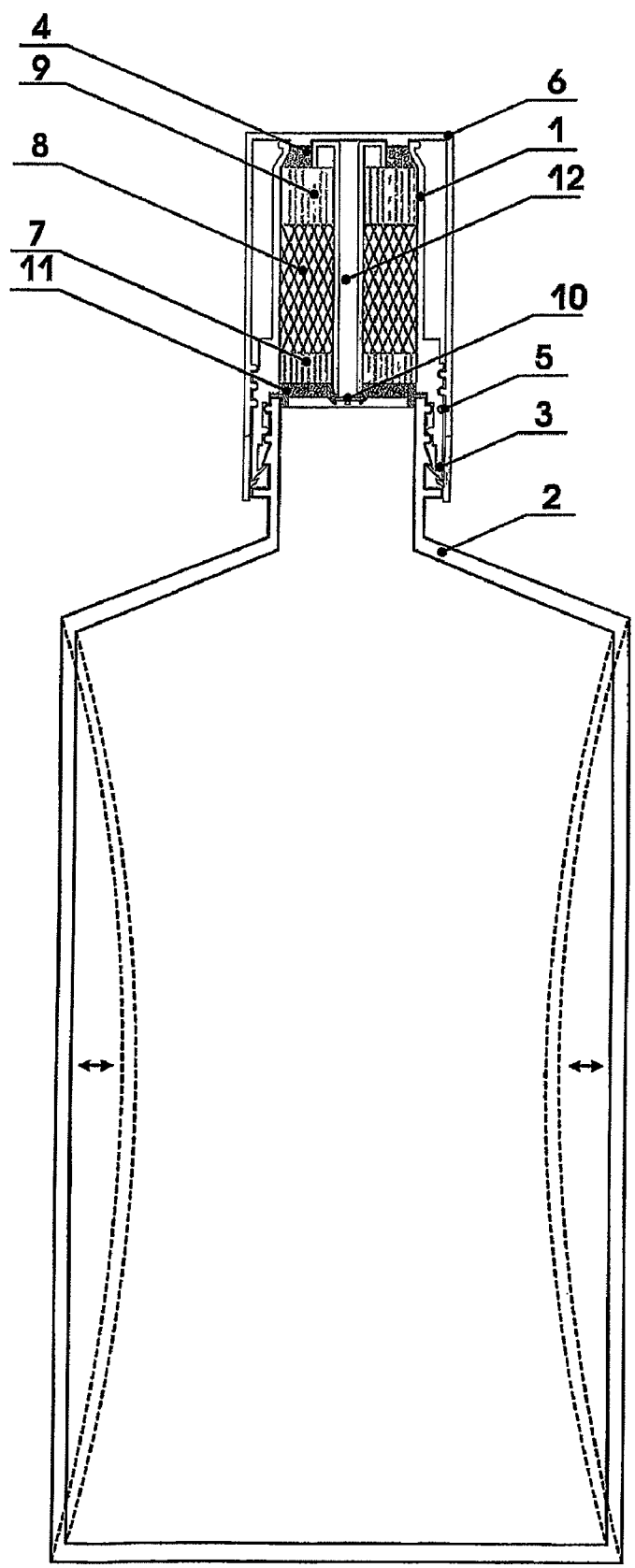

The invention is intended to perform the method of individual treatment and purification of each portion of vodka poured from a bottle prior to consumption thereof by the consumer himself and can be implemented in the distillery industry for treatment and purification of bottled vodka.

There exists a device for treating and purifying a liquid product (see U.S. Pat. No. 6,193,886 dated 27 Feb. 2001), which contains a cartridge consisting of a body connectable with the neck of an elastic bottle and a filter located therein, a feeder with a release valve.

The imperfection of the existing device is in its low efficiency in purification of the product, caused by the irregularity of purification, since different amounts of liquid pass through different volumes of the filtering material, as well as by an irrational use of the cross section of the neck of the bottle.

The technical result intended to be achieved by the invention is in elimination of the said imperfection.

The abovementioned result is achieved by the following: the device for treatment and purification of a liquid product, containing a cartridge which, in turn, consists of the body connectable with the neck of an elastic bottle with the central air feeder, the filter located therein and an encapsulating element with a release valve, the filter is fixed on the internal surface of the body, and the release valve is fixed on the air feeder in the area of its outgoing orifice. The filter may be formed by the sequentially placed filtering materials of rough filtering, sorbing agent or a mixture thereof and the fine filtering material. The outgoing orifice of the body may contain a spreader. The connection of the body with the neck of the bottle may be performed with a lock which prevents the cartridge from disengaging of the neck of the bottle. The device can be equipped with a decorative cap to be screwed onto the body.

The essence of the invention is illustrated by the drawings.

The drawing 1 shows the device containing the cartridge connected with the neck of a bottle. The Cartridge consists of the body 1, which has a fitting place for screwing onto the neck of the bottle 2 with the lock 3, which prevents disengaging of the cartridge, the spreader 4, located on the outgoing orifice, screw thread on the outside 5 to screw the decorative cap on and the filter, consisting of the sequentially placed rough filtering material 7, sorbing agent 8 and fine filtering material 9.

The mechanism for ensuring the required pressure of vodka in the inner space of the bottle consists of the body of the bottle, made of an elastic material and the release valve 10 integrated into the encapsulating element 11 in the area of the outgoing orifice of the air feeder 12 on the body of the cartridge.

The operation of the individual treatment and purification device for treatment and purification of the already bottled vodka by a consumer prior to consumption, which represents this invention, is as follows:

The acquired sealed bottle of vodka is taken into one's hands, opened by unscrewing the decorative sealing cap 6 and is turned with its neck down over the drinking vessel. The vodka contained in the bottle flows through the orifices in the encapsulating element 11 to the rough filtering material 7, part thereof, by effect of gravitational forces, passes through it and enters the space of the cartridge filled with activated charcoal and (or) other sorbing agents 8, which provide the required level of treatment of the vodka in the bottle. Having percolated through the sorbing agent 8, the vodka of the required quantity and with comfortable speed is unable to pass through the fine filtering material due to the decrease of pressure as the consequence of the tenuous air in the internal space of the bottle 2 and greater aggregate resistance of the filtering materials and the sorbing agent. To push the vodka through the filter, the user squeezes the bottle, as the result of which the internal volume of the vodka container decreases, the pressure in it increases and the portion of vodka pours out of the bottle through the release nozzle of the spreader of the restraint into the drinking vessel. If this is insufficient, the hand shall release squeezing the bottle, which, under the effect of the elastic forces, begins to unfold itself to the original form, the pressure in it decreases, the release valve 10 is opened and the external air is sucked into the interior space through the air feeder 12. The pressure in the internal volume of the bottle is equalized. The consumer repeatedly squeezes the bottle 2, the pressure therein increases, the release valve 10 shuts, and vodka, being filtered, treated and filtered again through the fine purification filter, is poured into the drinking vessel. The process is repeated until the latter is filled. After which the bottle is turned with its neck up, the pressure in it is leveled and it is encapsulated by screwing the cap onto it. If required, the operation is repeated.

The drawing 2 shows the version of the device pressed onto the neck of the bottle.

Although the above shows only one preferable version of implementation of the invention, it is obvious that in accordance with the definition attached, there can also be other versions of implementation, corresponding to the volume of the present invention.

The invention claimed is:

1. A device for the treatment and purification of a liquid product, comprising:
    a cartridge, comprising a body having an internal surface, said body having a bottom end connectable with a top edge of a neck of an elastic bottle and a top end defining an outgoing orifice;
    a multi-layered filter fixed to said internal surface of said body, said multi-layered filter comprising a plurality of layers of filtering material superimposed one above the other, whereby said filter defines the sole passageway for the discharge of the liquid product from the bottle;
    a separate inner air feeder, comprising an open top end, a bottom end disposed adjacent to the top edge of the neck of the bottle and defines a passageway therebetween to intake air solely therethrough; and
    an encapsulating element located adjacent to the top edge of the neck of the bottle, said encapsulating element defining an orifice adjacent to said multi-layered filter to permit the liquid product to flow out of the elastic bottle solely through said multi-layered filter and out of said outgoing orifice, said encapsulating element having a release valve incorporated therein which is disposed adjacent to said bottom end of said air feeder, wherein said release valve is moveable from a closed position to prevent the liquid product from entering said air feeder and an open position to allow air to enter the bottle solely through said air feeder.

2. The device according to claim 1, wherein:
    said plurality of layers of filtering material comprise sequentially placed rough filtering material, sorbing agent and fine filtering material.

3. The device according to claim 1, wherein:
    said release valve fixed on said bottom end of said air supply channel is a nipple-type valve.

4. The device according to claim 1, further comprising:
a lock to connect said body with the neck of the bottle.

5. The device according to claim 1, further comprising:
a decorative cap connectable with said body.

6. The device according to claim 5, wherein:
said decorative cap is connectable with said body by means of a thread with a pilfer-proof-cap in the form of a detachable ring.

7. The device according to claim 1, wherein:
said release valve is disposed in said closed position when a pressure in the bottle increases to a predetermined level and is disposed in said open position when the pressure in the bottle decrease to a predetermined level.

* * * * *